United States Patent

[11] 3,543,824

[72] Inventor Leslie Arthur Parsons
Burry Port, South Wales
[21] Appl. No. 785,201
[22] Filed Dec. 19, 1968
[45] Patented Dec. 1, 1970
[73] Assignee Les. Parsons and Sons Engineers Limited
Burry Port, South Wales, Great Britain
[32] Priority Dec. 29, 1967
[33] Great Britain
[31] No. 59,254/67

[54] TREATMENT OF FRUIT AND VEGETABLE CROPS
9 Claims, 8 Drawing Figs.
[52] U.S. Cl. ................................................. 146/226,
146/49, 146/221.7, 146/230, 146/241, 146/83
[51] Int. Cl. ....................................................... A23n 7/00
[50] Field of Search ....... ..................................... 146/32, 43,
49, 83, 227, 226, 247, 230, 241(P)

[56] References Cited
UNITED STATES PATENTS

| | | | | |
|---|---|---|---|---|
| 1,206,258 | 11/1916 | Salomon...................... | | 146/32X |
| 2,229,610 | 1/1941 | Nicholoy..................... | | 146/227UX |
| 2,612,170 | 9/1952 | Dudley, Jr. .................. | | 146/43X |
| 2,766,794 | 10/1956 | Odale........................... | | 146/43X |
| 2,906,308 | 9/1959 | Genetti, Sr. .................. | | 146/32X |
| 3,354,923 | 11/1967 | Voller.......................... | | 146/227X |

*Primary Examiner*—Willie G. Abercrombie
*Attorney*—Young and Thompson

ABSTRACT: A method of (and apparatus for) skinning onions comprising feeding onions to a pipe closely following each other in a continuous stream and conveying the onions through the pipe by a stream of fluid under such pressure that it removes the outer skins of the onions without disintegrating the edible parts of onions.

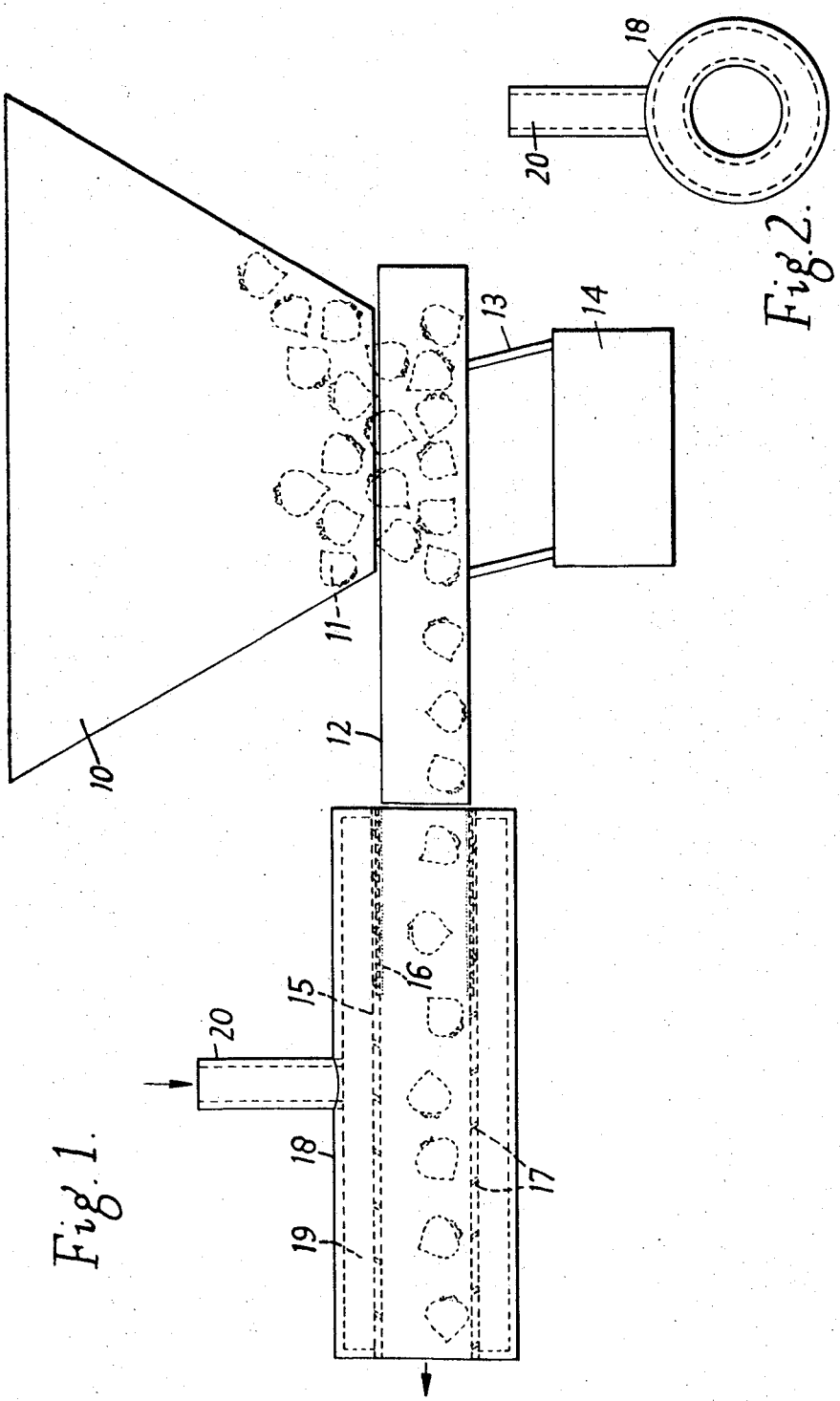

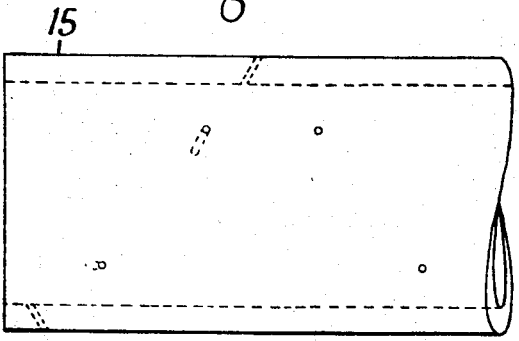
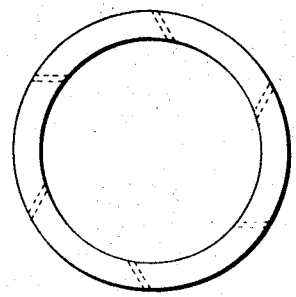
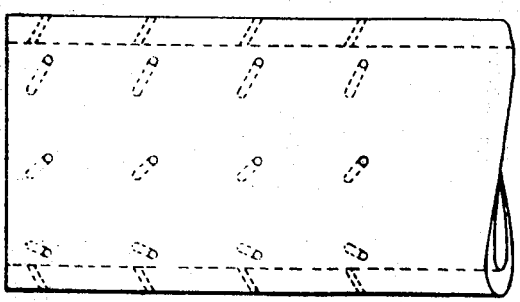
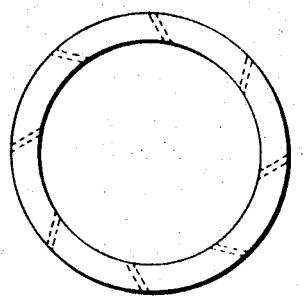
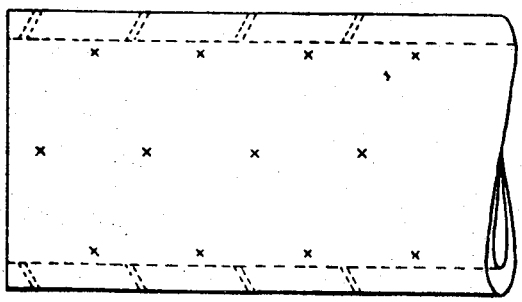
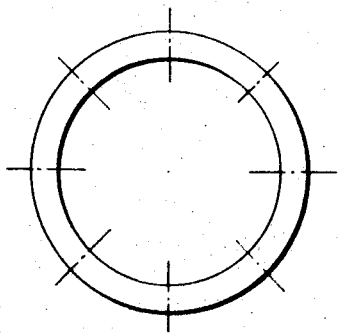

TREATMENT OF FRUIT AND VEGETABLE CROPS

This invention relates to the skinning of onions.

According to the invention we provide a method of skinning onions comprising feeding onions to a pipe closely following each other in a continuous stream and conveying the onions through the pipe by a stream of fluid under such pressure that it removes the outer skins of the onions without disintegrating the edible parts of onions.

Also according to the invention we provide an apparatus for skinning onions comprising a pipe through which onions can pass, means for injecting fluid into the pipe to convey the onions through the pipe and to remove the skins from the onions, and means to feed onions to the pipe at such a rate in relation to the speed of the onions that a continuous stream of onions is maintained in the pipe from one end to the other with adjacent onions in contact or close proximity to each other.

The fluid may be air, water stream or other fluid not harmful to the onions.

The invention will now be more fully described with reference to the accompanying drawings wherein:

FIG. 1 is a side elevation of an apparatus made in accordance with the invention;

FIG. 2 is a front elevation of part thereof; and

FIGS. 3 and 4, 5 and 6, and 7 and 8 are similar views of part of the apparatus showing various modifications.

FIG. 1 shows a hopper 10 containing onions 11 to be skinned. These onions have their stems removed but still need to be topped and tailed. The onions fall from the hopper on to a vibratory V-shaped section trough 12 carried by vibrator arms 13 which are vibrated by a device 14.

The onions are fed by the trough 12 into the open end of a pipe or tube 15. Part of the initial length of the tube has its interior surface roughened at 16 so as to scratch or cut the skins of the onions. Both at the roughened part and between the roughened part 16 and the outlet end of the tube there are openings 17 in the wall of the tube. The tube 15 is surrounded by a jacket 18 that is spaced from the tube to provide an air manifold 19. The jacket has an inlet 20 for compressed air which enters the manifold 19 and passes through all the openings 17 to form high pressure jets of air that provide a suction to draw onions into the tube and feed the onions along the tube and cause a swirling motion of the onions against the roughened part 16 whereby the onion skins are cut or abraded and the skins are blown off the onions. The onions are thereafter fed to an onion topping and tailing machine (not shown) whereafter the onions are ready for bottling.

The openings 17 may be arranged in various patterns. For example as shown in FIGS. 3 and 4 the openings are at 30° to the axis of the pipe or tube 15 and at 30° to the radius. Six double angled openings are shown on a four inch helix pitch. In FIGS. 5 and 6 eight rows of holes are shown at one inch, the rows being parallel to the axis, the holes in each row being one inch apart. In FIGS. 7 and 8 the holes are in rows parallel to the axis, the holes of each row being staggered in relation to the holes of the adjacent row.

The tube may be straight or curved e.g. spiral and may be associated with means for feeding the skinned onions direct to the topping and tailing machine. Means may be provided for weakening the skins in some other manner e.g. by a knife or knives to effect slitting or by a flame. The pipe must of course be larger than the maximum diameter of the onions.

The onions are fed by the hopper 10 and vibrator 12 at such a speed that the tube 18 is maintained substantially full of onions following each other closely or even in contact.

While it is preferred to remove skins before topping and tailing, it is possible in some cases to effect topping and tailing before skinning.

I claim:

1. A method of skinning onions comprising feeding onions to a pipe closely following each other in a continuous stream and conveying the onions through the pipe by a stream of gaseous fluid, said fluid including a plurality of jets entering the stream along its length, said jets being arranged in such angular directions that the onions rotate as they move along the pipe, and selecting the pressure of the fluid such that it removes the outer skins of the onions without disintegrating the edible parts of onions.

2. A method as claimed in claim 1 wherein the onions are skinned before topping and tailing and are subsequently subjected to a cutting operation to remove the tops and tails.

3. A method as claimed in claim 1 wherein the onion skins are mechanically weakened before being removed by the fluid.

4. A method as claimed in claim 1 wherein the onions are fed to the inlet end of the pipe and are drawn into the pipe by suction.

5. A method as claimed in claim 1 wherein the fluid whirls the onions against a roughened part of the pipe adjacent to the inlet end thereof.

6. Apparatus for skinning onions comprising a pipe through which onions can pass, means for injecting gaseous fluid into the pipe through holes in the wall of the pipe to convey the onions through the pipe and to remove the skins from the onions, and means to feed onions to the pipe at such a rate in relation to the speed of the onions that a continuous stream of onions is maintained in the pipe from one end to the other with adjacent onions in contact or close proximity to each other, said holes being spaced apart along the pipe and being arranged in such angular disposition as to cause the onions to rotate as they pass along the pipe thereby causing the skins to be removed from the onions.

7. Apparatus as claimed in claim 6 wherein the holes are angled forwardly so as to direct jets of gaseous fluid to feed the onions along the pipe.

8. Apparatus as claimed in claim 6 having means at the entrance to the pipe for weakening the skins before they are removed by the fluid.

9. Apparatus as claimed in claim 6 wherein the pipe is surrounded by a jacket spaced therefrom to receive fluid to supply all or at least some of the jets.